(No Model.)
A. W. PAULL.
THERMOMETER.
No. 342,222. Patented May 18, 1886.
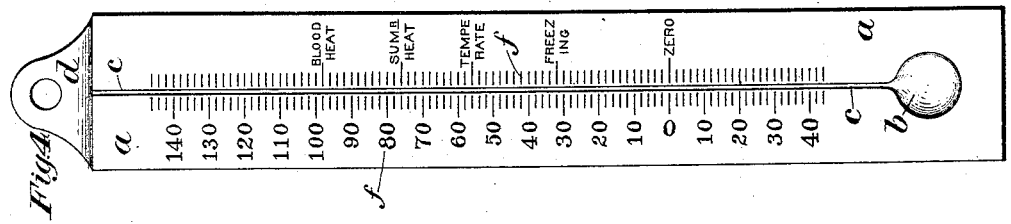
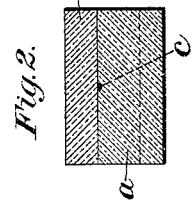 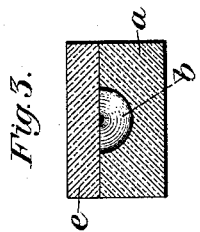
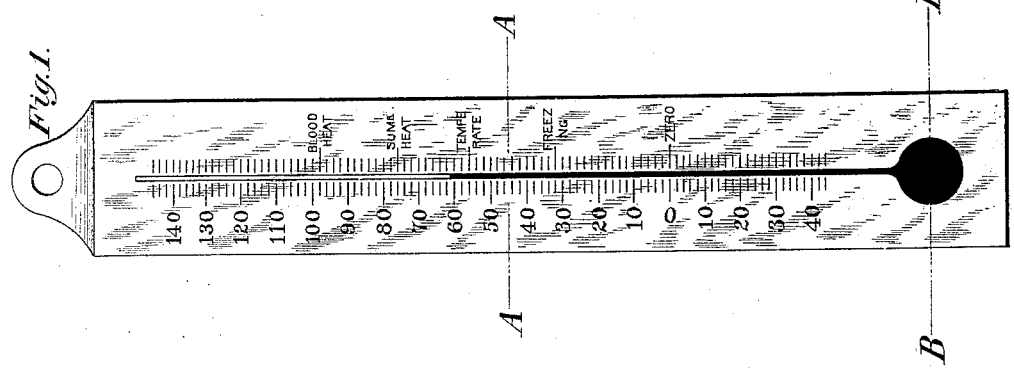
Witnesses.
Harry L. Gill
W. B. Corwin
Inventor.
Archibald W. Paull
by his attys
Bakewell & Kerr

UNITED STATES PATENT OFFICE.

ARCHIBALD W. PAULL, OF WHEELING, WEST VIRGINIA, ASSIGNOR OF ONE-HALF TO JOHN F. MILLER, OF MARTIN'S FERRY, OHIO.

THERMOMETER.

SPECIFICATION forming part of Letters Patent No. 342,222, dated May 18, 1886.

Application filed January 14, 1886. Serial No. 188,522. (No model.)

*To all whom it may concern:*

Be it known that I, ARCHIBALD W. PAULL, of Wheeling, in the county of Ohio and State of West Virginia, have invented a new and useful Improvement in Thermometers; and I do hereby declare the following to be a full, clear, and exact description thereof.

As at present commonly constructed thermometers are provided with a metallic plate back of the glass mercury tube and bulb, upon which plate the scale for registering the movements of the column of fluid is inscribed. This plate, being of metal, has a different degree of expansion or contraction from the glass of which the tube is composed, so that the readings of the instrument are lacking in precision, and constantly varying. In the construction of expensive thermometers a glass plate is substituted for the metal one just mentioned, which to a considerable extent obviates the difficulty just referred to, but does not entirely correct the same, because the thickness and form of the glass tube and the scale are so different as to produce certain differences in the degrees of expansion and contraction.

The purpose of my improvement is to overcome these objections, and to so construct the thermometer that the part provided with the scale shall expand equally with the tube and bulb.

To enable others skilled in the art to make and use my invention, I will now describe it by reference to the accompanying drawings, in which—

Figure 1 is a face view of my improved thermometer. Figs. 2 and 3 are sections on the lines A A and B B of Fig. 1. Fig. 4 is a view of the back plate or part of the thermometer.

Like letters of reference indicate like parts in each.

In making my improved thermometer I form a plate, *a*, of glass, by pressing by the use of a suitable mold and plunger having a bulb-cavity, *b*, of any desired form in cross-section, and a tube-cavity, *c*, also of any desired form in cross-section, reaching from the bulb-cavity *b* to the upper end of the plate. The plate *a* is also preferably made with a perforated lug, *d*, for suspending it. Upon this plate or back piece, *a*, I place a face-plate, *e*, of clear glass, said plate *e* being secured to the plate *a* either by uniting them while hot, so that they shall constitute one piece, or by uniting them by means of a suitable cement, which will make a tight joint between them, and will not obscure those parts of the plate *a* which should be visible through the face-plate. The plate *e* closes the front sides of the cavities *b* and *c*. If desired, these cavities may be partially formed in each of the plates *a* and *e;* but this is unnecessary, and somewhat more expensive, because it would require the inner side of the plate *e* to be formed by a plunger or mold. I also preferably make the scale *f* upon the plate *a* by impressing it therein by means of a mold or plunger; but I do not limit myself to thus forming the scale, because it may be cut or otherwise made, if desired, upon the surface of either of the plates *a* or *e*. When the fluid is placed in the tube-cavity *c*, the upper end of such cavity is closed in a suitable manner.

While I have described the particular method of constructing the particular form of my improved thermometer illustrated in the drawings, I do not limit myself thereto, because the method of manufacture is not of the essence of my invention, and because it will be apparent to those skilled in the arts that it may be made by pressing in other ways, and that the form may be varied considerably.

The main object of my invention consists in the fact that the expansion and contraction of the instrument will not cause a variation in the readings nor affect its precision.

An additional advantage is, that the cost of a thermometer made in this way is very much less than those heretofore in use, so that I form a much cheaper and more reliable instrument than those now generally in use.

What I claim as my invention, and desire to secure by Letters Patent, is—

1. A thermometer-case, composed of glass, having a molded tube and bulb cavity, substantially as and for the purposes described.

2. A thermometer-case, composed of glass, having a molded tube and bulb cavity and a scale on the glass body, substantially as and for the purposes described.

3. A glass thermometer-case having a molded tube and bulb cavity and a molded scale, substantially as and for the purposes described.

4. A thermometer-case, composed of a glass plate or back, having a tube and bulb cavity molded in the face of the same, and a face-plate of glass attached to the face of the back plate, and forming the front side of the tube and bulb cavity, substantially as and for the purposes described.

In testimony whereof I have hereunto set my hand this 29th day of December, A. D. 1885.

ARCHIBALD W. PAULL.

Witnesses:
HARRY W. PAULL,
J. R. PAULL.